(12) United States Patent
Lee et al.

(10) Patent No.: US 9,279,988 B2
(45) Date of Patent: Mar. 8, 2016

(54) THREE DIMENSIONAL IMAGE DISPLAY APPARATUS

(71) Applicant: SAMSUNG DISPLAY CO., LTD., Yongin, Gyeonggi-Do (KR)

(72) Inventors: Jee-Na Lee, Suwon-si (KR); Tae-Gil Kang, Hwaseong-si (KR); Man-Soo Kim, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 406 days.

(21) Appl. No.: 13/670,807

(22) Filed: Nov. 7, 2012

(65) Prior Publication Data

US 2013/0286477 A1    Oct. 31, 2013

(30) Foreign Application Priority Data

Apr. 30, 2012  (KR) .......................... 10-2012-0045251

(51) Int. Cl.
  *G02B 27/22*  (2006.01)
  *G02B 27/64*  (2006.01)

(52) U.S. Cl.
  CPC .............. *G02B 27/22* (2013.01); *G02B 27/646* (2013.01)

(58) Field of Classification Search
  None
  See application file for complete search history.

(56) References Cited

U.S. PATENT DOCUMENTS

| | | | |
|---|---|---|---|
| 8,045,087 B2 | 10/2011 | Hwang et al. | |
| 2006/0050195 A1* | 3/2006 | Choi et al. | ....................... 349/58 |
| 2010/0039578 A1 | 2/2010 | Roh et al. | |
| 2011/0134057 A1 | 6/2011 | Kubo | |

* cited by examiner

*Primary Examiner* — Jade R Chwasz
(74) *Attorney, Agent, or Firm* — Cantor Colburn LLP

(57) ABSTRACT

A three dimensional image display apparatus includes a panel unit, a receiving container and an anti-shock part. The panel unit includes a display panel and an optical panel. The optical panel sorts a left eye image and a right eye image. The receiving container surrounds a side of the panel unit. The anti-shock part is disposed between the panel unit and the receiving container, and restricts movement of the panel unit toward the receiving container.

22 Claims, 6 Drawing Sheets

THREE DIMENSIONAL IMAGE DISPLAY APPARATUS

This application claims priority to Korean Patent Application No. 10-2012-0045251, filed on Apr. 30, 2012, and all the benefits accruing therefrom under 35 U.S.C. §119, the contents of which are incorporated by reference herein in their entireties.

BACKGROUND

1. Field

Exemplary embodiments of the invention relate to a three dimensional ("3D") image display apparatus. More particularly, exemplary embodiments of the invention relate to a 3D image display apparatus capable of improving impact strength.

2. Description of the Related Art

As a demand for a 3D stereoscopic image increases in industrial fields such as theatre or home film, computer games, and so on, a stereoscopic image display apparatus displaying the 3D stereoscopic image has been improved. The stereoscopic image display apparatus displays the 3D stereoscopic image by respectively providing two-dimensional ("2D") images different from each other to left and right eyes of an observer. Thus, the observer recognizes a pair of two different 2D images, and the pair of two different 2D images is mixed in a brain of the observer, so that the observer may perceive the 3D stereoscopic image.

The stereoscopic image display apparatus is classified as a stereoscopic type and an auto-stereoscopic type according to whether or not the observer wears special glasses. Generally, the auto-stereoscopic type image display apparatus such as a barrier type, a lenticular type and so on are used for a flat display apparatus. The stereoscopic type display apparatus includes an active shutter type.

In the active shutter type display apparatus, the observer wears polarizer glasses, and the stereoscopic display apparatus alternately displays a left image and a right image using an active shutter disposed in the display apparatus, so that the observer may perceive the 3D stereoscopic image.

In the barrier type display apparatus, light passing through left and right pixels is blocked and transmitted by using a parallax barrier, such that the light passing through the left pixel inputs to the left eye of an observer and the light passing through the right pixel inputs to the right eye of an observer. Thus, the 3D stereoscopic image may be displayed.

In the lenticular type display apparatus, light passing through the left and right pixels is refracted by using a lens, such that the 3D stereoscopic image may be displayed.

SUMMARY

One or more exemplary embodiments of the invention provide a three dimensional image display apparatus capable of improving impact strength.

According to an exemplary embodiment of the invention, a three dimensional image display apparatus includes a panel unit, a receiving container and an anti-shock part. The panel unit includes a display panel and an optical panel. The optical panel sorts a left eye image and a right eye image. The receiving container surrounds a side of the panel unit. The anti-shock part is disposed between the panel unit and the receiving container, and restricts movement of the panel unit toward the receiving container.

In an exemplary embodiment, the anti-shock part may include an upper surface, a lower surface opposite to the upper surface, an inside surface facing the side of the panel unit, and an outside surface opposite to the inside surface.

In an exemplary embodiment, the receiving container may include a mold frame. The mold frame may include a supporting part supporting the panel unit, and a side wall extended from the supporting part, the side wall guiding the panel unit.

In an exemplary embodiment, the mold frame may further include a bump protruded from the side wall. The anti-shock part may further include a furrow recessed in the outside surface. The bump may be combined with the furrow.

In an exemplary embodiment, a distance between the anti-shock part and the side wall may be smaller than a distance between the panel unit and the side wall.

In an exemplary embodiment, the receiving container may further include a top chassis disposed on the panel unit. The top chassis may include an opening exposing the panel unit and a combining groove. The side wall may include a combining protrusion. The combining protrusion may be combined with the combining groove.

In an exemplary embodiment, the mold frame may further include a guiding protrusion protruding from the side wall of the mold frame. The guiding protrusion may contact the panel unit.

In an exemplary embodiment, the side of the panel unit may be spaced apart from the side wall of the mold frame.

In an exemplary embodiment, the optical panel may include a first optical substrate, and a second optical substrate disposed on the first optical substrate. A first distance between the display panel and the side wall may be larger than a second distance between the second optical substrate and the side wall. The second distance may be larger than a third distance between the first optical substrate and the side wall.

In an exemplary embodiment, the supporting part of the mold frame may overlap a portion of the display panel.

In an exemplary embodiment, an adhesive layer may be between the anti-shock part and the panel unit, the adhesive layer attaching the lower surface of the anti-shock part to the optical panel.

In an exemplary embodiment, the adhesive layer may be disposed between the lower surface of the anti-shock part and the second optical substrate.

In an exemplary embodiment, the anti-shock part may further include a first edge defined by the outside surface and the upper surface, and the first edge may contact the receiving container. The anti-shock part may further include a second edge defined by the outside surface and the lower surface, and the second edge may be spaced apart from the receiving container.

In an exemplary embodiment, the inside surface of the anti-shock part may contact the side of the panel unit.

In an exemplary embodiment, the panel unit may further include a driving part which drives the display panel and the optical panel. The driving part may be disposed under the receiving container.

In an exemplary embodiment, the optical panel may include a first optical substrate, and a second optical substrate disposed on the first optical substrate. A first distance between the display panel and the side wall may be larger than a second distance between the second optical substrate and the side wall. The second distance may be larger than a third distance between the first optical substrate and the side wall. An adhesive layer may be between the anti-shock part and the panel unit, the adhesive layer attaching the lower surface of the anti-shock part to the second optical substrate.

In an exemplary embodiment, the lower surface of the anti-shock part may have a stepped shape.

In an exemplary embodiment, an angle formed by the upper surface and the outside surface of the anti-shock part may be less than about 90 degrees.

In an exemplary embodiment, the outside surface of the anti-shock part may contact the receiving container.

In an exemplary embodiment, the anti-shock part may include at least one of polypropylene ("PP") resin, polyphenylene sulfide ("PPS") resin, acrylonitrile-butadiene-styrene ("ABS") resin and elastomer.

In an exemplary embodiment, the three dimensional image display apparatus may further include a driving part which drives the panel unit, a first connecting part which electrically connects the driving part to the display panel, and a second connecting part which electrically connects the driving part to the optical panel, the second connecting part including a detachable connecter.

According to one or more exemplary embodiments of the invention, the three dimensional image display apparatus includes the anti-shock part which absorbs shock transferred to the panel unit from outside the display apparatus, so that impact strength of the three dimensional image display apparatus may be improved.

In addition, the anti-shock part has a shape corresponding to a shape of a side of the panel unit, so that a portion of the three dimensional image display apparatus which is not overlapped with the first optical substrate, the second optical substrate, the first display substrate or the second display substrate may be protected from external impacts.

In addition, the anti-shock part includes elastic material, and has variety of shapes, so that external impacts may be efficiently reduced.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
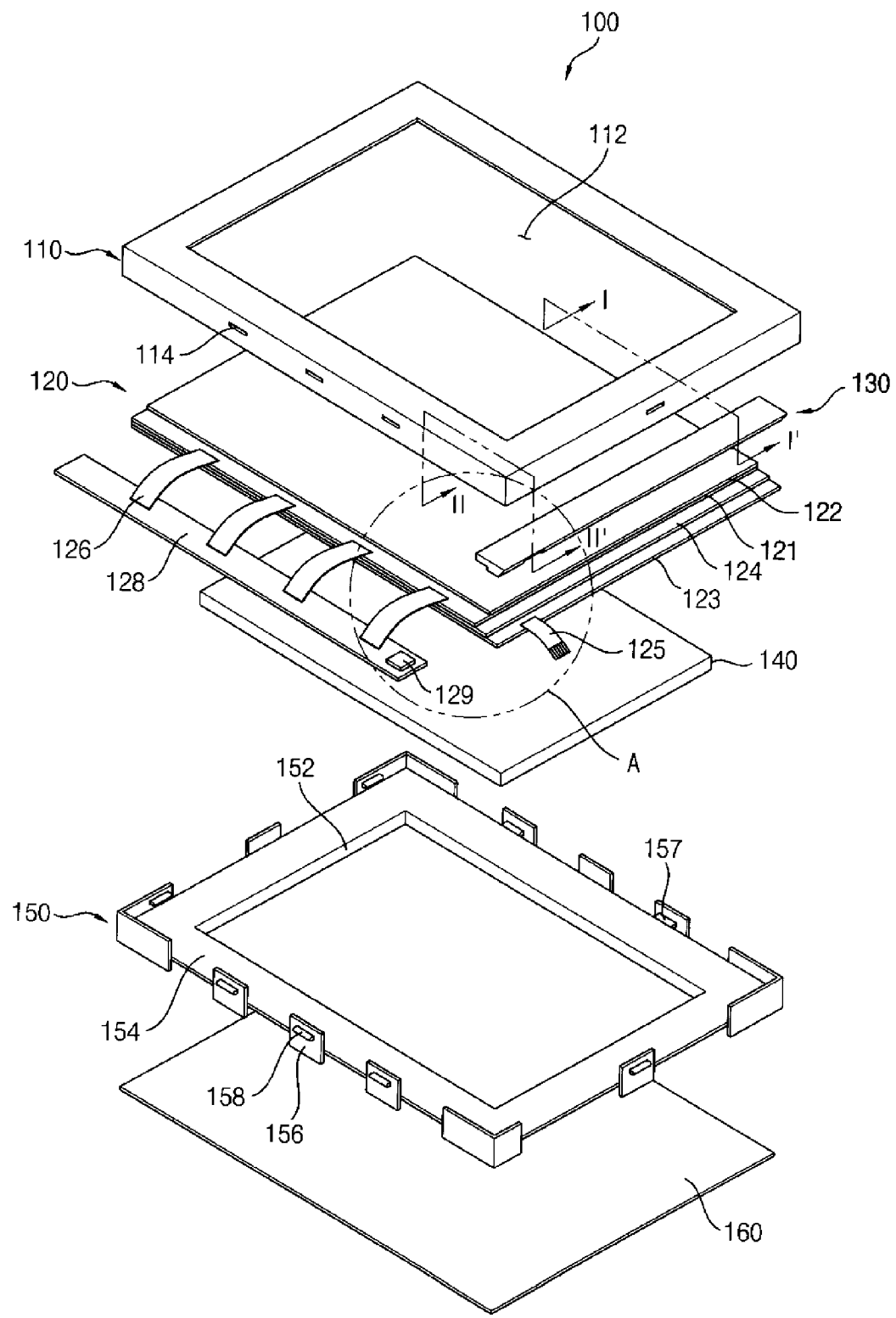
FIG. 1 is a exploded perspective view illustrating an exemplary embodiment of a three dimensional image display apparatus according to the invention.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Stereoscopic image display apparatuses include additional panels such as a barrier panel and an active shutter panel, as well as a display panel. The stereoscopic image display apparatus is heavier in comparison to a traditional display apparatus, so that the stereoscopic image display apparatus is weak to external impacts.

Hereinafter, the invention will be explained in detail with reference to the accompanying drawings.

FIG. 1 is an exploded perspective view illustrating an exemplary embodiment of a three dimensional image display apparatus according to the invention.

Referring to FIG. 1, the three dimensional image display apparatus 100 includes a receiving container, a panel unit 120, an anti-shock part 130 and a backlight assembly 140. The receiving container includes a top chassis 110, a mold frame 150 and a cover 160.

The top chassis 110 includes an upper plate, and a side plate extended from outer edges of the upper plate. The top chassis 110 may include a plurality of side plates extended from the outer edges of the upper plate.

The top chassis 110 includes an opening 112 and a combining groove 114. The upper plate includes the opening 112 and the side plate includes the combining groove 114. The opening 112 exposes a portion of the panel unit 120, such as a display portion, so that the panel unit 120 may display an image through the opening 112. The combining groove 114 is disposed at a side plate of the top chassis 110, and is combined to the mold frame 150. Although the top chassis 110 includes the combining groove 114 in the exemplary embodiment, another means for combining may be disposed at the side of the top chassis 110. In one exemplary embodiment, for example, a hole may be disposed at the side of the top chassis 110 to combine with a fastening member of the mold frame 150 such as a bolt.

The panel unit 120 displays a three dimensional image. The panel unit 120 is disposed between the top chassis 110 and the backlight assembly 140. The panel unit 120 is received in the mold frame 150. The panel unit 120 includes a display panel and an optical panel. The display panel includes a first display substrate 121, and a second display substrate 122 facing the first display substrate. The optical panel includes a first optical substrate 123, and a second optical substrate 124 facing the first optical substrate 123. Detailed description about the panel unit 120 will be further provided with respect to FIG. 2.

The anti-shock part 130 is disposed on at least one side of the panel unit 120 and protects the panel unit 120 from external impacts. The anti-shock part 130 is disposed between the top chassis 110 and the mold frame 150, so that the side of the panel unit 120 is protected from impacting or contacting a side wall 156 of the mold frame 150. Detailed description about the anti-shock part 130 will be further provided with respect to FIG. 2.

The backlight assembly 140 generates a light and supplies the light to the panel unit 120. The backlight assembly 140 may include at least one of optical sheets, a light guiding plate, a light source assembly and a reflector. The light source assembly may include a plurality of point light sources such as a light emitting diode ("LED") or line light sources. In addition, the light source assembly may include a light source driving part, so that the LED may be driven. The light guiding plate changes incident light which has a light distribution of a point or a line light source to exiting light which has light distribution of a surface light source. Thus, the light guiding plate guides the light generated from the light source assembly to the panel unit 120.

The mold frame 150 includes a receiving portion 152 receiving the backlight assembly 140, a supporting portion 154 supporting the panel unit 120, and the side wall 156 extending from the supporting portion 154.

The receiving portion 152 receives the backlight assembly 140. The receiving portion 152 may include a lower plate, and a side plate extending from the lower plate toward the panel unit 120. The backlight assembly 140 may be received in the receiving portion 152.

The supporting portion 154 extends from the receiving portion 152. The supporting portion 154 may be substantially parallel with the lower plate of the receiving portion 152. The panel unit 120 is disposed on the supporting portion 154. Thus, a portion of the panel unit 120 overlaps the supporting portion 154 in a plan view. In the exemplary embodiment, for example, the supporting portion 154 partially overlaps the first and second optical substrates 123 and 124 of the optical panel, and partially overlaps the first and second display substrates 121 and 122 of the display panel. Therefore, a weight load at the first optical substrate 123 may be reduced.

The side wall 156 extends from the supporting portion 154. The side wall 156 may be on a portion of the supporting portion 154. In the exemplary embodiment, for example, three sidewalls 156 are on a long side of the mold frame 150 and are spaced apart from each other such that the side wall 156 is on a portion of the supporting portion 154. Thus, in a portion of the mold frame 150 excluding the side wall 156, a first connecting part 126 may pass through a space between a side of the supporting portion 154 and the top chassis 110.

The side wall 156 may include a guiding protrusion 157 contacting the side of the panel unit 120 to fix the panel unit 120. The guiding protrusion 157 contacts the panel unit 120 to fix the panel unit 120.

The mold frame 150 may have a space receiving a driving part 128. In an exemplary embodiment, for example, the driving part 128 may be disposed under the mold frame 150.

The side wall 156 may include a protrusion 158. The protrusion 158 is combined with the combining groove 114 of the top chassis 110. Although the side wall 156 includes the protrusion 158 in the exemplary embodiment, another means for combining the mold frame 150 to the top chassis 110 may be employed. In one exemplary embodiment, for example, the mold frame 150 may be combined to the top chassis 110 by a bolt and a nut.

The cover 160 covers a rear portion of the mold frame 150. The cover 160 may have variety shapes according to a position of the driving part 128 with respect to the mold frame 150. In one exemplary embodiment, for example, the cover 160 may be disposed under the mold frame 150, so that the cover 160 may cover the driving part 128. Although not shown in figures, the mold frame 150 may have an opening at the rear portion, so that heat generated from the backlight assembly 140 may be emitted to the cover 160 through the opening.

Figure 2:
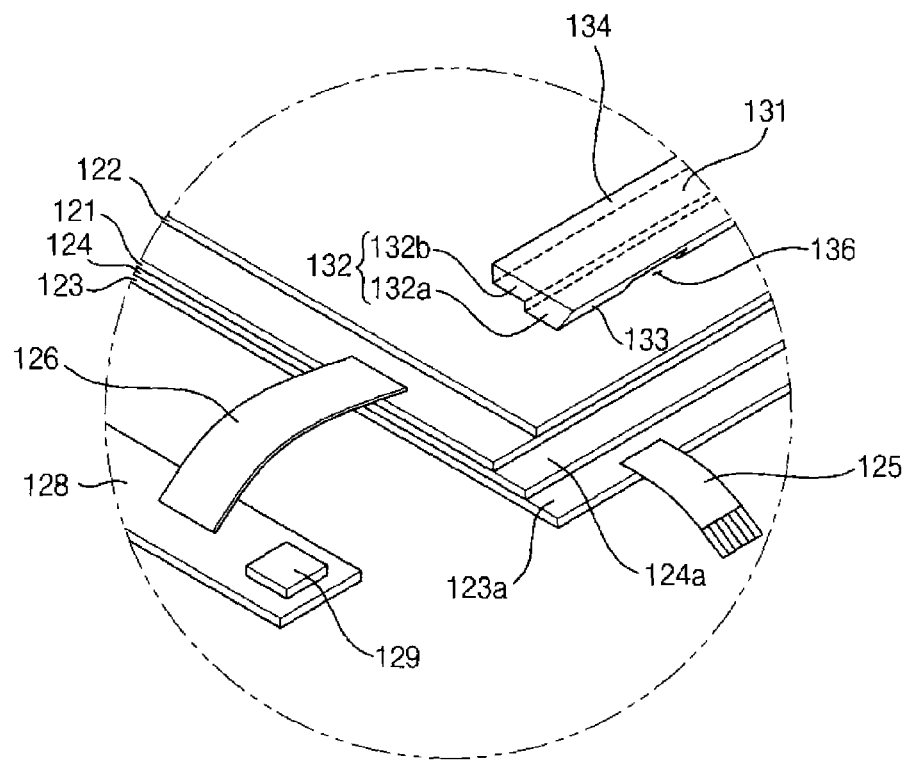
FIG. 2 is an enlarged view of portion A in FIG. 1.
Figure 3:
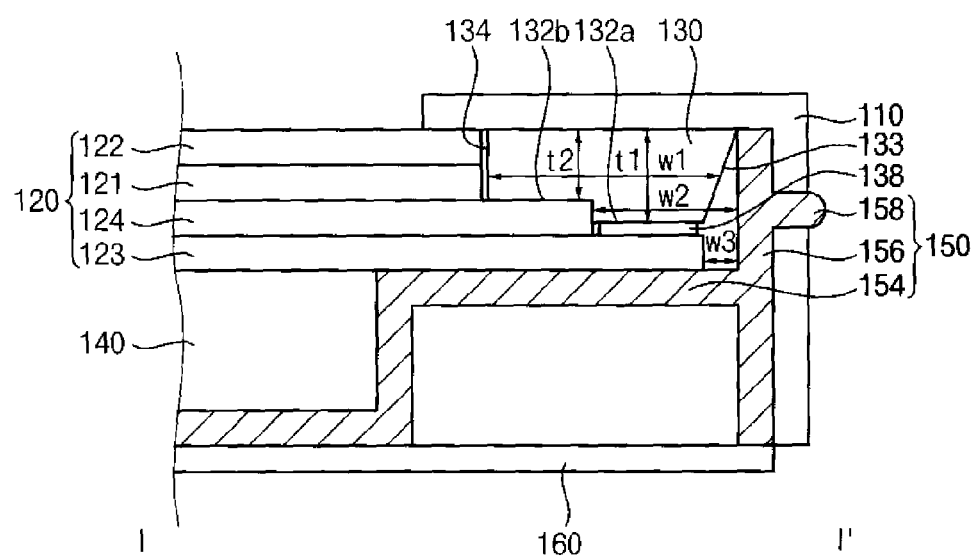
FIG. 3 is a cross-sectional view taken along line I-I' of FIG. 1.
Figure 4:
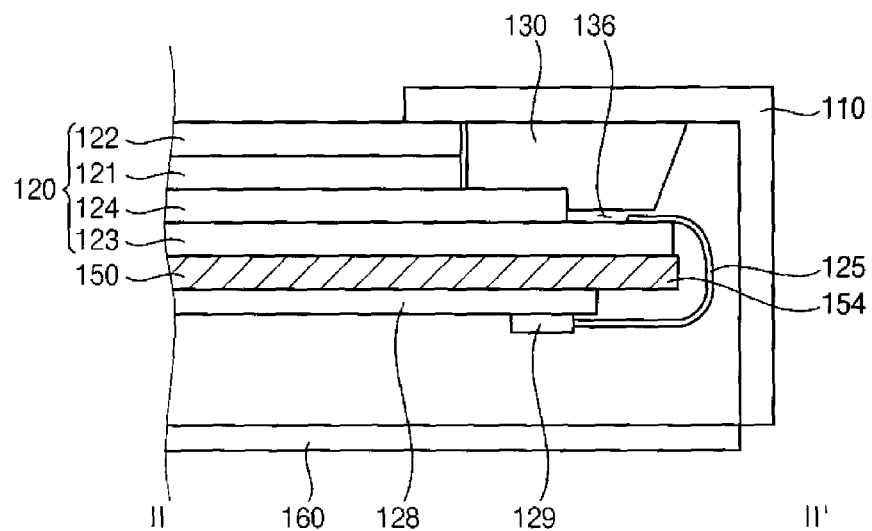
FIG. 4 is a cross-sectional view taken along line II-II' of FIG. 1.

FIG. 2 is an enlarged view of portion A in FIG. 1. FIG. 3 is a cross-sectional view taken along line I-I' of FIG. 1. FIG. 4 is a cross-sectional view taken along line II-II' of FIG. 1.

Referring to FIGS. 2 to 4, the panel unit 120 includes the display panel and the optical panel.

The display panel displays an image according to a driving signal and a data signal, using the light generated from the backlight assembly 140. The display panel includes the first display substrate 121, the second display substrate 122 and a liquid crystal layer (not shown) disposed between the first display substrate 121 and the second display substrate 122. The display panel is electrically connected to the driving part 128 through the first connecting part 126.

The optical panel controls path of the light generated from the backlight assembly 140, for changing the image to a 3D stereoscopic image. The optical panel includes the first optical substrate 123, and the second optical substrate 124 facing the first optical substrate 123. The first optical substrate 123 is electrically connected to the driving part 128 through a second connecting part 125.

A distance between a side of the optical panel and the side wall 156 of the mold frame 150 is smaller than a distance between a side of the display panel and the side wall 156 of the mold frame 150. In the exemplary embodiment, for example, a first distance w1 between the first and second display substrates 121 and 122 and the side wall 156 of the mold frame 150 is larger than a second distance w2 between the second optical substrate 124 and the side wall 156 of the mold frame 150. In addition, the second distance w2 is larger than a third distance w3 between the first optical substrate 123 and the side wall 156 of the mold frame 150. Thus, a stepped shape is formed between the mold frame 150 and the first optical substrate 123, a stepped shape is formed between the first optical substrate 123 and the second optical substrate 124, and a stepped shape is formed between the second optical substrate 124 and the first and second display substrates 121 and 122.

An exposed portion 123a of the first optical substrate 123 is not overlapped with the second optical substrate 124, the first display substrates 121 or the second display substrates 122. An exposed portion 124a of the second optical substrate 124 is not overlapped with the first display substrates 121 or the second display substrates 122. A portion of the first display substrate 121 may not overlap the second display substrate 122.

A portion of the three-dimensional display apparatus 100 where the first optical substrate 123 is not overlapped with the second optical substrate 124, the first display substrates 121 or the second display substrates 122, may be weak from external impact in comparison to a portion where the first optical substrate 123 overlaps the second optical substrate 124, the first display substrates 121 or the second display substrates 122. The second connecting part 125 may be formed at the portion where the first optical substrate 123 is not overlapped with other substrates.

The second connecting part 125 electrically connects the driving part 128 and the optical panel. An end of the second connecting part 125 may be disposed on and/or electrically connected to the exposed portion 123a of the first optical substrate 124.

In an exemplary embodiment, the optical panel may include a barrier panel, but is not limited thereto or thereby. Pixels of the display panel include a right pixel and a left pixel. The barrier panel blocks and passes light from the right pixel and the left pixel using a parallax barrier, so that a left eye of an observer sees the left pixel and right eye of the observer sees the right pixel. Thus, the observer may perceive the 3D stereoscopic image.

In an exemplary embodiment, the optical panel may include a lenticular lens panel, but is not limited thereto or thereby. The 3D stereoscopic image may be displayed by refracting the light from the left and right pixel of the display panel, using the lenticular lens panel.

Alternatively, the optical panel may have various modifications to control the path of the light generated from the backlight assembly 140 for displaying the 3D stereoscopic image.

The anti-shock part 130 includes an upper surface 131, a lower surface 132 opposite to the upper surface 131, an outside surface 133 connecting the upper surface 131 to the lower surface 132, and an inside surface 134 connecting the upper surface 131 to the lower surface 132. A second portion of the inside surface 134 faces the side of the first and second display substrates 121 and 122, and a first portion of the inside surface 134 faces the second optical substrate 124.

The lower surface 132 includes a first lower surface 132a and a second lower surface 132b. The lower surface 132 corresponds to the first and second optical substrate 123 and 124 which have the stepped shape. The first lower surface 132a faces an upper surface of the first optical substrate 123. The second lower surface 132b faces an upper surface of the second optical substrate 124. An adhesive layer 138 may be disposed between the first lower surface 132a and the first optical substrate 123. The adhesive layer 138 attaches the anti-shock part 130 to the first optical substrate 123. In an alternative embodiment, the adhesive layer 138 may be omitted.

A distance t1 between the first lower surface 132a and the upper surface 131 of the anti-shock part 130 is larger than a distance t2 between the second lower surface 132b and the upper surface 131. Thus, the first lower surface 132a and the second lower surface 132b form a stepped shape.

A distance between the anti-shock part 130 and the side wall 156 of the mold frame 150 is smaller than a distance between the panel unit 120 and the side wall 156 of the mold frame 150. The anti-shock part 130 is between the panel unit 120 and the side wall 156 of the mold frame 150, and restrict movement of the panel unit 120 toward the side wall 156 of the mold frame 150. Thus, even though the portion of the three-dimensional display apparatus 100 where the first optical substrate 123 is not overlapped with the second optical substrate 124, the first display substrates 121 or the second display substrates 122, may be weak from external impact, the panel unit 120 may be protected from external impacts.

The outside surface 133 of the anti-shock part 130 faces the side wall 156 of the mold frame 150. A portion of an edge formed by the outside surface 133 and the upper surface 131 may contact the side wall 156. In addition, an edge formed by the outside surface 133 and the lower surface 132 may be spaced apart from the side wall 156. An angle formed by the upper surface 131 and the outside surface 133 of the anti-shock part may be less than 90 degrees. The edges may extend along a short side of the three-dimensional display apparatus 100, but are not limited thereto or thereby. Thus, a buffer space between the anti-shock part 130 and the side wall 156 of the mold frame 150, is formed adjacent to the side wall 156.

The inside surface 134 corresponds to the side of the panel unit 120. Thus, the inside surface 134 faces the side of the first and second display substrates 121 and 122. A stepped shape formed by the first lower surface 132a and the second lower surface 132b faces a side of the second optical substrate 124. Thus, the anti-shock part 130 may protect a portion of the first optical substrate 123 not overlapped by the second optical substrate 124, the first display substrates 121 and the second display substrate 122 from the external impact.

A groove 136 may be formed on the lower surface 132 of the anti-shock part 130. The groove 136 forms a space for the second connecting part 125 and connection to the optical panel. The second connecting part 125 is connected to the driving part 128 through the groove 136, and a space between the mold frame 150 and the top chassis 110.

The anti-shock part 130 includes an elastic material to absorb the external impact.

In one exemplary embodiment, for example, the anti-shock part 130 may include polypropylene ("PP") resin, polyphenylene sulfide ("PPS") resin, acrylonitrile-butadiene-styrene ("ABS") resin, elastomer and etc. In addition, the anti-shock part 130 may include rubber.

The driving part 128 drives the panel unit 120. The driving part 128 is disposed under the mold frame 150. The driving part 128 may be disposed under the panel unit 120 and adjacent to a side of the backlight assembly 140. In addition, the driving part 128 may be disposed under the backlight assembly 140 and under the mold frame 150.

Figure 5:
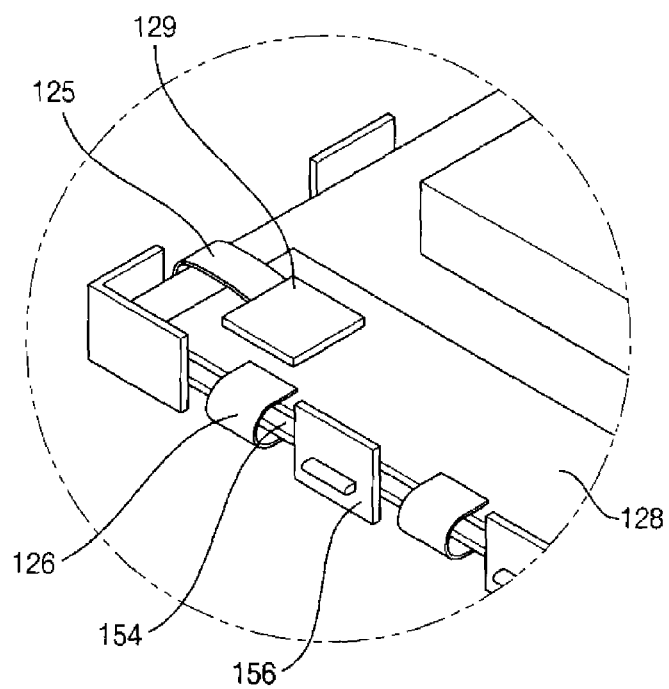
FIG. 5 is an enlarged perspective view of the three dimensional image display apparatus in FIG. 1, to explain a relationship of a mold frame, a driving part, a connector and a second connecting part thereof.

FIG. 5 is an enlarged perspective view illustrating the three dimensional image display apparatus in FIG. 1, to explain a relationship of a mold frame, a driving part, a connector and a second connecting part.

Referring to FIG. 5, the driving part 128 is disposed under the supporting portion 154 of the mold frame 150. The first connecting part 126 may include a flexible printed circuit board. The first connecting part 126 connects the first display substrate 121 to the driving part 128 through a space between the side walls 156 of the mold frame 150.

The second connecting part 125 may include a flexible printed circuit board and/or a detachable connector, but is not limited thereto or thereby. The second connecting part 125 connects the first optical substrate 123 to the driving part 128 through a space between the side wall 156 of the mold frame 150. The connector 129 is disposed on the driving part 128. The second connecting part 125 is coupled to the connector 129 to electrically connect the first optical substrate 123 to the driving part 128.

Thus, the driving part 128 drives both of the optical panel and the display panel.

Figure 6:
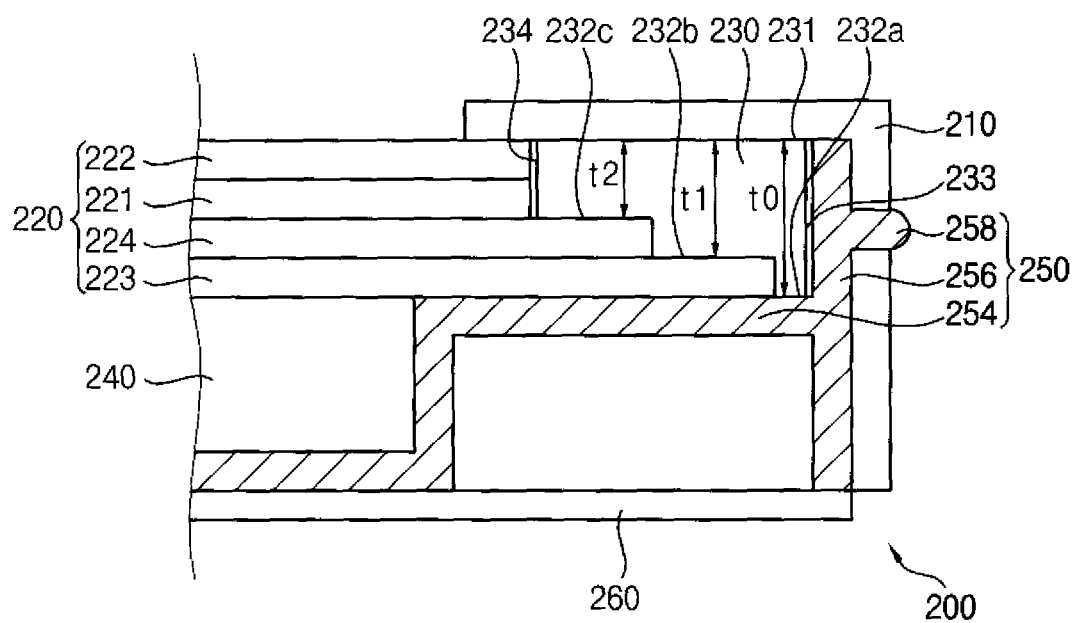
FIG. 6 is a cross-sectional view illustrating another exemplary embodiment of a three dimensional image display apparatus according to the invention.

FIG. 6 is a cross-sectional view illustrating another exemplary embodiment of a three dimensional image display apparatus according to the invention.

Referring to FIG. 6, the three dimensional image display apparatus 200 is substantially same as the three dimensional image display apparatus 100 of FIGS. 1 to 4, except for a shape of an anti-shock part 230. Thus, any further detailed descriptions concerning the same elements will be omitted.

The three dimensional image display apparatus 200 includes a receiving container, a panel unit 220, the anti-shock part 230 and a backlight assembly 240. The receiving container includes a top chassis 210, a mold frame 250 and a cover 260.

The anti-shock part 230 is disposed on at least one side of the panel unit 220 to protect the panel unit 220 from external impacts. The anti-shock part 230 is disposed between the top chassis 210 and the mold frame 250, so that the side of the panel unit 220 is protected from impacting or contacting a side wall 256 of the mold frame 250. The side wall 256 may include a protrusion 258.

The anti-shock part 230 includes an upper surface 231, a lower surface opposite to the upper surface 231, an outside surface 233 connecting the upper surface 231 to the lower surface and an inside surface 234 connecting the upper surface 231 to the lower surface. The inside surface 234 faces sides of first and second display substrates 221 and 222 and first and second optical substrates 223 and 224.

The lower surface includes a first lower surface 232a, a second lower surface 232b and a third lower surface 232c, so that the lower surface corresponds to the first and second optical substrate 223 and 224 which form stepped shapes. The first lower surface 232a faces an upper surface of a supporting portion 254 of the mold frame 250. The second lower surface 232b faces an upper surface of the first optical substrate 223. The third lower surface 232c faces an upper surface of the second optical substrate 224. A distance t0 between the first lower surface 232a and the upper surface 231 is larger than a distance t1 between the second lower surface 232b and the upper surface 231. In addition, the distance t1 is larger than a distance t2 between the third lower surface 232c and the upper surface 231. Thus, the first lower surface 232a and the second lower surface 232b form a stepped shape. The second lower surface 232b and the third lower surface 232c form another stepped shape.

A distance between the anti-shock part 230 and the side wall 256 is smaller than a distance between the panel unit 220 and the side wall 256. Thus, the panel unit 220 may be protected from external impacts.

The outside surface 233 faces the side wall 256 of the mold frame 250. A portion of the outside surface 233 may contact the side wall 256. Alternatively, the outside surface 233 may be spaced apart from the side wall 256, and not contact the side wall 256 of the mold frame 250.

The inside surface 234 corresponds to the side of the panel unit 220. Thus, the stepped shapes formed by the inside surface 234 and the first to third lower surfaces 232a, 232b and 232c face the sides of the of first and second display substrates 221 and 222 and the first and second optical substrates 223 and 224.

The anti-shock part 230 has a shape corresponding to a side of the panel unit 220. Thus, the anti-shock part 230 may protect an exposed portion of the first optical substrate 223 not overlapped by the second optical substrate 224, the first display substrates 221 and the second display substrate 222 from the external impacts.

Figure 7A:
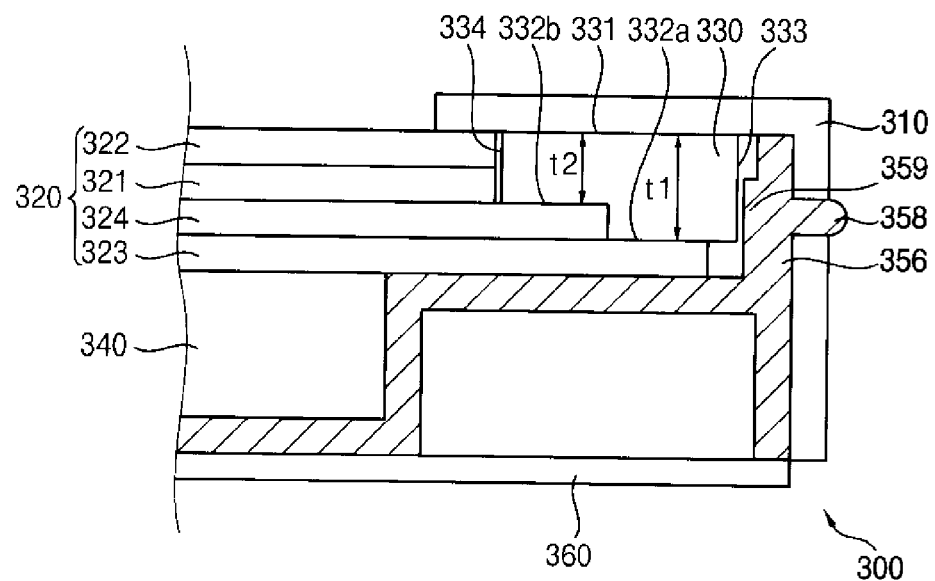
FIG. 7A is a cross-sectional view illustrating still another exemplary embodiment of a three dimensional image display apparatus according to the invention.
Figure 7B:
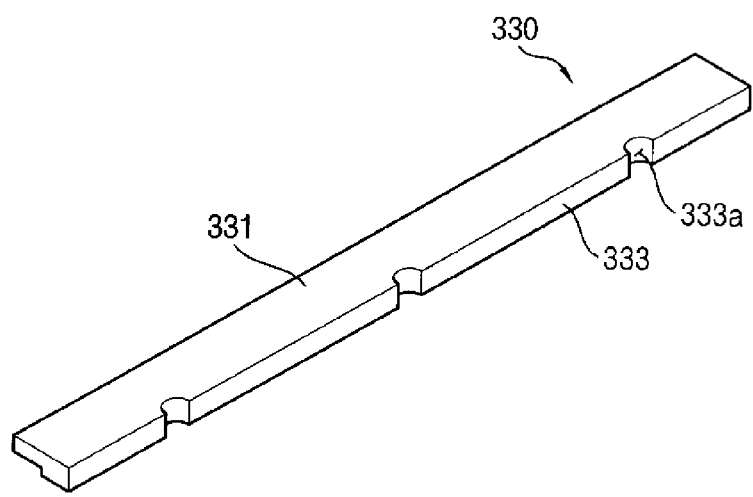
FIG. 7B is a perspective view illustrating an exemplary embodiment of an anti-shock part in FIG. 7A.

FIG. 7A is a cross-sectional view illustrating still another exemplary embodiment of a three dimensional image display apparatus according to the invention. FIG. 7B is a perspective view illustrating an exemplary embodiment of an anti-shock part in FIG. 7A.

Referring to FIGS. 7A and 7B, the three dimensional image display apparatus 300 is substantially same as the three dimensional image display apparatus 100 of FIGS. 1 to 4, except for a shape of an anti-shock part 330 and a bump 359 of a mold frame. Thus, any further detailed descriptions concerning the same elements will be omitted.

The three dimensional image display apparatus 300 includes a receiving container, a panel unit 320, the anti-shock part 330 and a backlight assembly 340. The receiving container includes a top chassis 310, the mold frame and a cover 360.

A side wall 356 of the mold frame may include the bump 359 on an inside thereof. The bump 359 is combined with a furrow 333a of the anti-shock part 330 which will be described later. The side wall 356 may include a protrusion 358.

The anti-shock part 330 is disposed on at least one side of the panel unit 320 to protect the panel unit 320 from external impacts. The anti-shock part 330 is disposed between the top chassis 310 and the mold frame, so that the side of the panel unit 320 is protected from impacting or contacting the side wall 356 of the mold frame.

The anti-shock part 330 includes an upper surface 331, a lower surface 332 opposite to the upper surface 331, an outside surface 333 connecting the upper surface 331 to the lower surface and an inside surface 334 connecting the upper surface 331 to the lower surface 332. The inside surface 334 faces sides of first and second display substrates 321 and 322 and a second optical substrate 324.

The lower surface includes a first lower surface 332a and a second lower surface 332b, so that the lower surface corresponds to first and second optical substrate 323 and 324 which form a stepped shape. The first lower surface 332a faces an upper surface of the first optical substrate 323. The second lower surface 332b faces an upper surface of the second optical substrate 324. A distance t1 between the first lower surface 332a and the upper surface 331 is larger than a distance t2 between the second lower surface 332b and the upper surface 331. Thus, the first lower surface 332a and the second lower surface 332b form a stepped shape.

A distance between the anti-shock part 330 and the side wall 356 is smaller than a distance between the panel unit 320 and the side wall 356. Thus, the panel unit 320 may be protected from external impacts.

The outside surface 333 faces the side wall 356 of the mold frame. The furrow 333a is recessed from the outside surface 333 and is combined with the bump 359. Thus, the anti-shock part 330 may be fixed to the mold frame 350 without additional adhesive.

The inside surface 334 corresponds to the side of the panel unit 320. Thus, the inside surface 334 faces the side of the first and second display substrates 321 and 322. A stepped shape formed by the first lower surface 332a and the second lower surface 332b faces a side of the second optical substrate 324. Thus, the anti-shock part 330 may protect an exposed portion of the first optical substrate 323 not overlapped by the second optical substrate 324, the first display substrates 321 and the second display substrate 322 from the external impacts.

Figure 8:
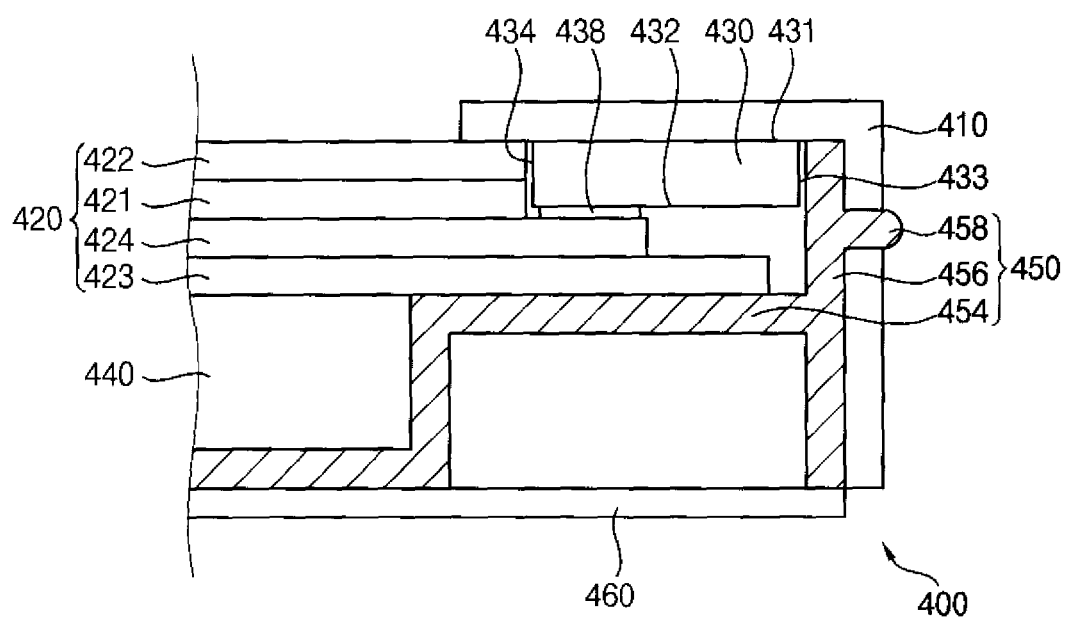
FIG. 8 is a cross-sectional view illustrating still another exemplary embodiment of a three dimensional image display apparatus according to the invention.

FIG. 8 is a cross-sectional view illustrating still another exemplary embodiment of a three dimensional image display apparatus according to the invention.

Referring to FIG. 8, the three dimensional image display apparatus 400 is substantially same as the three dimensional image display apparatus 100 of FIGS. 1 to 4, except for a shape of an anti-shock part 430 and an adhesive layer 438. Thus, any further detailed descriptions concerning the same elements will be omitted.

The three dimensional image display apparatus 400 includes a receiving container, a panel unit 420, the anti-shock part 430 and a backlight assembly 440. The receiving container includes a top chassis 410, a mold frame 450 and a cover 460. The mold frame 450 may include a receiving portion receiving the backlight assembly 440, a supporting portion 454 supporting the panel unit 420 and a side wall 456 extending from the supporting portion 454. The side wall 456 may include a protrusion 458.

The anti-shock part 430 is disposed on at least one side of the panel unit 420 to protect the panel unit 420 from external impacts. The anti-shock part 430 is disposed between the top chassis 410 and the mold frame 450, so that the side of the panel unit 420 is protected from impacting or contacting the side wall 456 of the mold frame 450.

The anti-shock part 430 includes an upper surface 431, a lower surface 432 opposite to the upper surface 431, an outside surface 433 connecting the upper surface 431 to the lower surface 432 and an inside surface 434 connecting the upper surface 431 to the lower surface 432. The inside surface 434 faces sides of first and second display substrates 421 and 422.

The lower surface 432 faces an upper surface of a second optical substrate 424. The adhesive layer 438 may be disposed between the lower surface 432 and the second optical substrate 424. The adhesive layer 438 attaches the anti-shock part 430 to the second optical substrate 424.

A distance between the anti-shock part 430 and the side wall 456 is smaller than a distance between the panel unit 420 and the side wall 456. Thus, the panel unit 420 may be protected from external impacts.

The outside surface 433 faces the side wall 456 of the mold frame 450. The outside surface 433 may contact the side wall 456. Alternatively, the outside surface 433 may be spaced apart from the side wall 456, and not contact the side wall 456 of the mold frame 450.

The inside surface 434 corresponds to the side of the panel unit 420. Thus, the inside surface 434 faces the first and second display substrates 421 and 422. Thus, the anti-shock part 430 may protect an exposed portion of a first optical substrate 423 not overlapped by the second optical substrate 424, the first display substrates 421 and the second display substrate 422 from the external impacts.

In one or more exemplary embodiment of the invention, although the anti-shock part 130, 230, 330 and 430 is disposed at only one side of the panel, the anti-shock part may have various modifications. In one or more alternative exemplary embodiment, for example, anti-shock part may be disposed at one side of the panel and at the another side of the panel, such as an opposing side of the panel. Thus, a plurality of anti-shock parts may be disposed adjacent to the panel to protect the panel.

According to one or more exemplary embodiment of the invention, a three dimensional image display apparatus includes an anti-shock part absorbing shock transferred to the panel unit from outside the display apparatus, so that impact strength of the three dimensional image display apparatus may be improved.

In addition, the anti-shock part has a shape corresponding to a shape of a side of the panel unit, so that a portion of the three dimensional image display apparatus which is not overlapped with the first optical substrate, the second optical substrate, the first display substrate or the second display substrate may be protected from external impacts.

In addition, the anti-shock part includes elastic material, and has variety of shapes, so that external impacts may be efficiently reduced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A three dimensional image display apparatus comprising:
    a panel unit comprising an optical panel which sorts a left eye image and a right eye image, and a display panel which is disposed on the optical panel, wherein in a top plan view, a portion of the optical panel is exposed from the display panel at a side end surface of the display panel;
    a receiving container comprising a mold frame of which an inner surface of a sidewall of the mold frame faces the side end surface of the display panel at which the portion of the optical panel unit is exposed by the display panel; and
    an anti-shock part between the side end surface of the display panel at which the portion of optical panel unit is exposed by the display panel, and the mold frame sidewall inner surface which faces the side end surface of the display panel at which the portion of the optical panel unit is exposed by the display panel, the anti-shock part overlapping the exposed portion of the optical panel, wherein the anti-shock part restricts movement of the panel unit toward the mold frame sidewall of the receiving container.

2. The three dimensional image display apparatus of claim 1, wherein the anti-shock part comprises:
an upper surface,
a lower surface opposite to the upper surface,
an inside surface which faces the side end surface of the display panel at which the portion of the optical panel unit is exposed by the display panel, and
an outside surface opposite to the inside surface.

3. The three dimensional image display apparatus of claim 2, wherein the mold frame comprises:
a supporting part which supports the panel unit, and
the side wall which extends from the supporting part, wherein the side wall guides the panel unit.

4. The three dimensional image display apparatus of claim 3, wherein
the optical panel of which the portion thereof is exposed from the display panel at the side end surface of the display panel comprises a first optical substrate, and a second optical substrate on the first optical substrate,
a first distance between the side end surface of the display panel at which the portion of the optical panel unit is exposed by the display panel and the mold frame sidewall inner surface, is larger than a second distance between a side end surface of the second optical substrate of the optical panel and the mold frame sidewall inner surface, and
the second distance is larger than a third distance between a side end surface of the first optical substrate of the optical panel and the mold frame sidewall inner surface.

5. The three dimensional image display apparatus of claim 4, wherein the supporting part of the mold frame overlaps a portion of the display panel.

6. The three dimensional image display apparatus of claim 4, further comprising an adhesive layer between the anti-shock part and the panel unit,
wherein the adhesive layer attaches the lower surface of the anti-shock part to the exposed portion of the optical panel.

7. The three dimensional image display apparatus of claim 6, wherein
a portion of the second optical substrate is exposed by the display panel, and
the adhesive layer is between the lower surface of the anti-shock part and the exposed portion of the second optical substrate of the optical panel.

8. The three dimensional image display apparatus of claim 2, wherein the anti-shock part further comprises:
a first edge defined by the outside surface and the upper surface, the first edge contacting the receiving container, and
a second edge defined by the outside surface and the lower surface, the second edge spaced apart from the receiving container.

9. The three dimensional image display apparatus of claim 2, wherein the inside surface of the anti-shock part contacts both the side end surface of the display panel and a distal end surface of the exposed portion of the optical panel of the panel unit.

10. The three dimensional image display apparatus of claim 2, wherein
the panel unit further comprises a driving part which drives the display panel and the optical panel, and
the driving part is under the receiving container.

11. The three dimensional image display apparatus of claim 2, further comprising an adhesive layer between the anti-shock part and the panel unit,
wherein
the optical panel of which the portion thereof is exposed from the display panel at the side end surface of the display panel comprises a first optical substrate, and a second optical substrate on the first optical substrate,
a first distance between the side end surface of the display panel at which the portion of the optical panel unit is exposed by the display panel and the mold frame sidewall inner surface, is larger than a second distance between a side end surface of the second optical substrate of the optical panel and the mold frame sidewall inner surface,
the second distance is larger than a third distance between a side end surface of the first optical substrate of the optical panel and the mold frame sidewall inner surface, and
the adhesive layer is between the lower surface of the anti-shock part and the second optical substrate of the optical panel, and attaches the lower surface to the second optical substrate.

12. The three dimensional image display apparatus of claim 2, wherein the lower surface of the anti-shock part has a stepped shape.

13. The three dimensional image display apparatus of claim 2, wherein an angle formed by the upper surface and the outside surface of the anti-shock part, is less than about 90 degrees.

14. The three dimensional image display apparatus of claim 2, wherein the outside surface of the anti-shock part contacts the receiving container.

15. The three dimensional image display apparatus of claim 1, wherein
the mold frame further comprises a bump protruding from the inner surface of the mold frame side wall toward the panel unit,
the anti-shock part further comprises a furrow recessed in the outside surface, and
the bump protruding from the inner surface of the mold frame side wall is combined with the furrow of the anti-shock part.

16. The three dimensional image display apparatus of claim 1, wherein a distance between the anti-shock part and the mold frame sidewall inner surface, is smaller than a distance between a distal end of the exposed portion of the optical panel and the mold frame sidewall inner surface.

17. The three dimensional image display apparatus of claim 1, wherein
the receiving container further comprises a top chassis on the panel unit,
the top chassis comprises:
an opening which exposes the panel unit, and
a combining groove,
the mold frame further comprises a combining protrusion protruding from an outer surface of the mold frame side wall opposite to the inner surface thereof, and
the combining protrusion of the mold frame is combined with the combining groove of the top chassis.

18. The three dimensional image display apparatus of claim 1, wherein the mold frame further comprises a guiding protrusion protruding from the inner surface of the mold frame side wall, and the guiding protrusion contacts the panel unit.

19. The three dimensional image display apparatus of claim 1, wherein a distal end of the exposed portion of the optical panel is spaced apart from the inner surface of the mold frame side wall.

20. The three dimensional image display apparatus of claim 1, wherein the anti-shock part comprises at least one of polypropylene resin, polyphenylene sulfide resin, acrylonitrile-butadiene-styrene resin and elastomer.

21. The three dimensional image display apparatus of claim 1, further comprising:
- a driving part which drives the panel unit,
- a first connecting part which electrically connects the driving part to the display panel of the panel unit, and
- a second connecting part which electrically connects the driving part to the optical panel of the panel unit, the second connecting part comprising a detachable connecter.

22. The three dimensional image display apparatus of claim 1, wherein the anti-shock part restricts movement of the panel unit toward the receiving container.

* * * * *